April 9, 1940.   J. TJAARDA   2,196,369
AUTOMOBILE BODY AERIAL
Filed Aug. 7, 1935
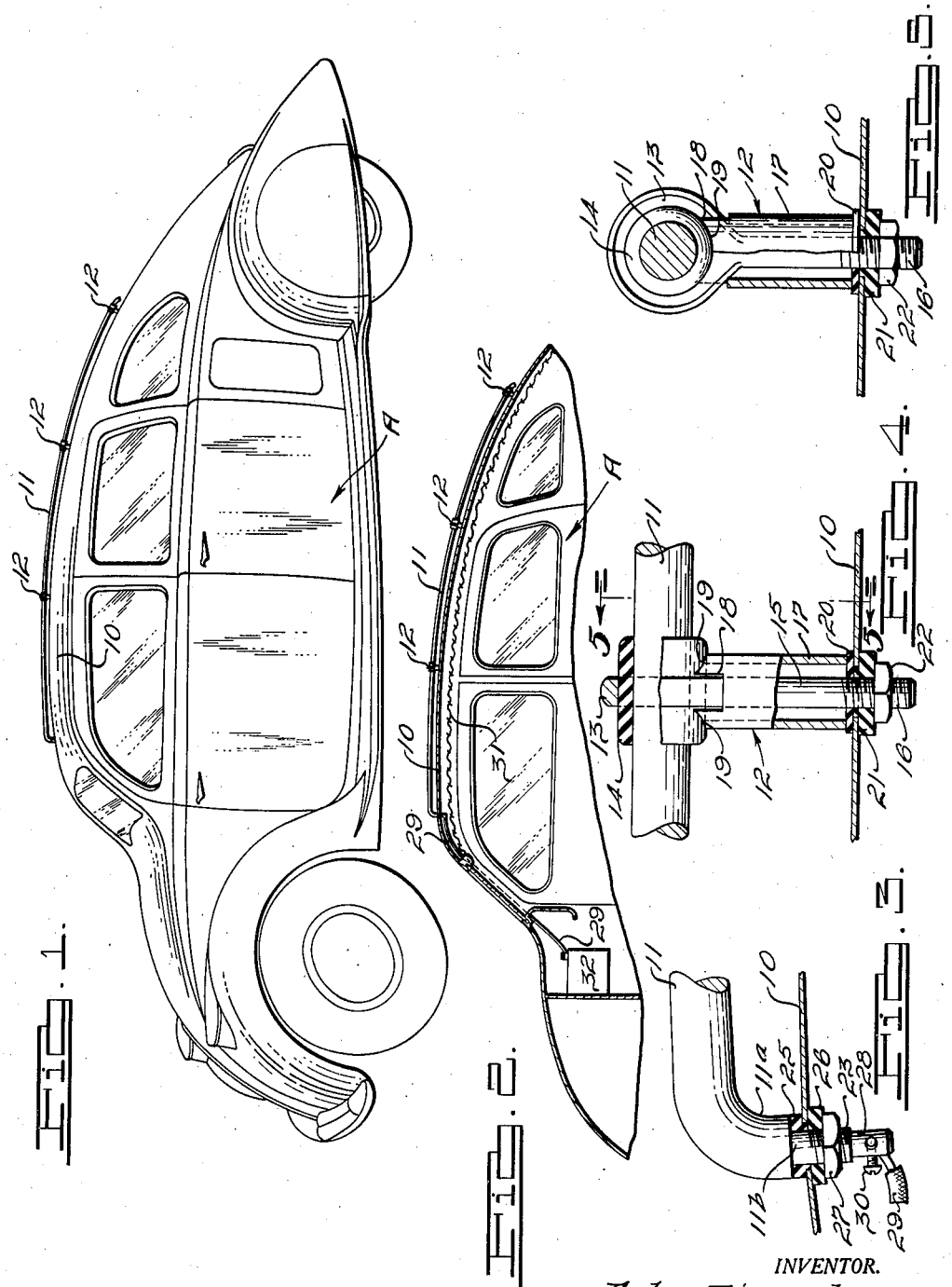
INVENTOR.
John Tjaarda.
BY
Dike, Colver & Gray
ATTORNEYS.

Patented Apr. 9, 1940

2,196,369

UNITED STATES PATENT OFFICE 2,196,369

AUTOMOBILE BODY AERIAL

John Tjaarda, Birmingham, Mich., assignor to Briggs Manufacturing Company, Detroit, Mich., a corporation of Michigan Application August 7, 1935, Serial No. 35,118

1 Claim. (Cl. 250—33)

This invention relates to improvements in antennae or aerials particularly adapted for use on motor vehicles.

An object of the invention is to provide an improved aerial or antenna installation in which the aerial or signal receiving portion of the antenna circuit is mounted on the roof of the motor vehicle and exteriorly thereof.

A further object of the invention is to provide an improved aerial installation for a motor vehicle, particularly an automobile, having an all steel or metal roof, the aerial being carried exteriorly of the steel roof and insulated therefrom in improved manner.

Other objects of this invention will appear in the following description and appended claim, reference being had to the accompanying drawing forming a part of this specification wherein like reference characters designate corresponding parts in the several views.

Fig. 1 is a perspective view of an automobile having an aerial mounted on the roof thereof pursuant to the present invention.

Fig. 2 is a fragmentary central longitudinal section through the body.

Fig. 3 is a sectional detail view illustrating the connection of the aerial to the lead-in conductor.

Fig. 4 is a detail section taken through one of the insulating spacer members.

Fig. 5 is a section taken through lines 5—5 of Fig. 4 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

One embodiment of the invention as applied to an automobile A having an all steel roof panel 10 is illustrated, by way of example, in Figs. 1 to 5 inclusive. The antenna circuit includes an aerial 11 preferably in the form of a heavy gauge copper wire or a copper rod, as shown, having substantial rigidity and strength against bending or distortion during use of the car. In the present instance, the aerial rod 11 extends in one direction longitudinally and centrally of the roof and is supported in spaced parallel relation thereto by means of insulators indicated as a whole at 12.

Each insulating spacer member 12 comprises an eye or ring 13 having fitted therein a tubular or sleeve-like insulating member 14 of suitable material such as hard rubber composition, fiber, or synthetic resin material. The aerial rod 11 passes snugly through the insulating parts 14 of the several members 12. Each ring 13 terminates in an elongated cylindrical shank 15 threaded at its lower end 16, which passes through a hole in the metal roof panel 10. Surrounding the shank 15 is a spacer sleeve 17. The upper end of this sleeve has opposed vertical slots or notches 18 to receive and provide clearance for the lower sides of the eye 13. The sleeve terminates in opposed seats 19 curved to fit the curvature of the insulating sleeve 14. Interposed between the lower end of the spacer 17 and the roof panel is a non-metallic insulating washer 20 of fiber, rubber or the like, centrally apertured to receive the shank 15. At the underside of the roof panel is an insulating washer 21 of similar non-metallic material, preferably rubber, which has a central boss portion fitting snugly into the hole in the roof panel between the edge thereof and the shank 15, as seen in Figs. 4 and 5. By tightening the nut 22 on the threaded portion 16 of the shank, the insulating sleeve 14 will be drawn down tightly against the sleeve 17 which will bear tightly on the washer 20. The washers 20 and 21 will be clamped against the panel 10, thus providing a firm water-tight joint. Moreover, pressure of the upper split ends of sleeve 17 on the sleeve 14 will distort the same a slight amount sufficient, however, to firmly grip the aerial rod 11.

The forward end of the aerial rod 11 has a right angle bend 11a terminating in a reduced portion 11b passing through a hole in the roof panel 10, see Fig. 3, and threaded at 23. Surrounding the reduced portion 11b is an insulating washer 25 of non-metallic material, preferably rubber composition, which has a boss fitting into the hole in panel 10 around the part 11b, this washer resting against the shoulder 24. At the under-side of the panel is an insulating washer 26 and the parts are firmly clamped together making a rigid water-tight joint by the nut 27.

From the foregoing it will be seen that the aerial comprises preferably a relatively rigid wire or rod 11 firmly supported on the metal roof panel by spacer members and fully insulated therefrom. The forward end 11a of the aerial passes through the forward end of the panel near the windshield header, while being insulated therefrom, and at all points of connection to the roof the joints are fully water-tight.

The rod 11 may be extended beyond the threaded part 23 to provide a binding post 28 to which the lead-in conductor wire 29 is attached through set screw 30. It will be seen that the interior parts 23, 28, 29 of the antenna are located between the interior fabric trim material 31 and the inside face of the roof panel 10, as seen in Fig. 2. The lead-in wire 29 may extend down the pillar at one edge of the windshield and thence to the radio receiving set 32 shown schematically in Fig. 2. Suitable coupling apparatus is employed in accordance with conventional practice for connecting the antenna circuit to the radio receiver, the set being grounded to the chassis or other metallic mass of the vehicle providing a suitable counterpoise for the antenna circuit of the receiver.

Although in the embodiment shown in Fig. 1 the outside aerial extends in one direction longitudinally of the vehicle, it is understood that the aerial rod may be formed in a loop or otherwise so as to extend in more than one direction thereby to ensure the best reception. In like manner, the aerial members 35 and 46 and the roof panel grooves or channels of the remaining embodiments may be extended in any direction or directions desired so as to secure the widest range of reception.

I claim:

In a vehicle body having a curved metal roof panel, an aerial including a relatively rigid rod extending substantially parallel to the plane of and conforming substantially to the curvature of said panel exteriorly thereof, said rod including a bent end portion extending through the panel and adapted to be connected to a receiving set within the body and means for insulatingly securing said portion to the roof panel.

JOHN TJAARDA.